United States Patent
Zhang et al.

(10) Patent No.: US 7,590,067 B2
(45) Date of Patent: Sep. 15, 2009

(54) METHOD AND APPARATUS FOR DERIVING ALLOWABLE PATHS THROUGH A NETWORK WITH INTRANSITIVITY CONSTRAINTS

(75) Inventors: Hong Zhang, Kanata (CA); Peter Ashwood Smith, Hull (Gatineau) (CA); Guo Qiang Wang, Kanata (CA)

(73) Assignee: Nortel Networks Limtied, St. Laurent, Quebec (CA)

( * ) Notice: Subject to any disclaimer, the term of this patent is extended or adjusted under 35 U.S.C. 154(b) by 1019 days.

(21) Appl. No.: 10/691,517

(22) Filed: Oct. 24, 2003

(65) Prior Publication Data

US 2005/0088978 A1 Apr. 28, 2005

(51) Int. Cl.
*G01R 31/08* (2006.01)
(52) U.S. Cl. .................. 370/238; 370/255; 370/257
(58) Field of Classification Search .......... None
See application file for complete search history.

(56) References Cited

U.S. PATENT DOCUMENTS 6,377,551 B1 4/2002 Luo et al. ............... 370/238
7,123,620 B1 * 10/2006 Ma ....................... 370/395.32

* cited by examiner

*Primary Examiner*—Jayanti K Patel
*Assistant Examiner*—Jung Park
(74) *Attorney, Agent, or Firm*—Ogilvy Renault LLP (57) ABSTRACT

A method of computing allowable routes through a data network that includes a subnetwork that introduces a subnet intransitivity constraint on allowable paths through the network involves using an abstracted network map to construct a directed graph that compensates for the subset intransitivity constraint by removing all unallowable paths. The abstracted network map may be used to compute least cost allowable paths through the network. The directed graph represents the same network, and is constructed by representing bi-directional links between the subnetwork elements with two directed edges, and representing the subnetwork elements as paired ingress and egress nodes. A method for constructing the directed graph representing an abstracted map of a network that exhibits subset intransitivity is also described.

19 Claims, 6 Drawing Sheets

METHOD AND APPARATUS FOR DERIVING ALLOWABLE PATHS THROUGH A NETWORK WITH INTRANSITIVITY CONSTRAINTS

CROSS-REFERENCE TO RELATED APPLICATIONS

This is the first application filed for the present invention.

MICROFICHE APPENDIX

Not Applicable.

TECHNICAL FIELD

The invention generally relates to procedures for determining paths through a network, and, in particular, to a method and apparatus for deriving allowable paths through a network with intransitivity constraints.

BACKGROUND OF THE INVENTION

Communications networks are formed of a number of network elements (NEs) interconnected by links. The links interconnecting the NEs may follow one of a number of predefined schemes, resulting in various network topologies, such as ring, star, linear, and full-mesh topologies. It is further commonplace in today's networks to find different autonomously managed networks bridged to each other at various gateways, and for data transport services to be provided across the networks in a manner that is transparent to users.

Typically, core networks receive traffic from edge networks, the core network providing interconnection between disparate edge networks, and generally providing longer haul data transport. In recent years for numerous reasons, including security, privacy, scalability, and especially for simplicity in making routing decisions, core network providers have begun presenting abstracted representations of the topologies of their core networks to edge network NEs. Generally, the core network is abstracted to represent a full mesh network (so that each abstracted NE is linked to each other abstracted NE). Such an abstracted network typically includes only the NEs relevant to the edge network, which may be every core NE that is liked to an edge network NE, or a subset of these core NEs.

As noted, one of the reasons for presenting the abstracted view of the core network is that routing decisions required by the edge networks are simplified. For example, many core networks have a ring topology, such as a synchronous optical network (SONET) ring, and many of those ring networks impose timeslot continuity restrictions on allowable paths. Timeslot continuity is a requirement that traffic conveyed over successive links of the ring must occupy the same timeslot on adjacent links. Where timeslot continuity is not available, traffic cannot be routed through the adjacent links in sequence, even though each link, taken alone, has sufficient capacity to carry the traffic. Such a problem introduces a constraint in computing routes through the abstracted core, because it is possible that capacity is available over a link ab between A and B, and a link bc between B and C, but traffic cannot transit ab and then bc in sequence. Such a constraint is termed "subset intransitivity", because transitivity (a well known mathematical property of binary relations asserting that for any a, b, c, if a is related to b, and b is related to c, then a is related to c) of the network fails if each of routes ab and bc are individually allowable but route abc (that is, routes ab and bc in sequence) is not allowable, in the same subnetwork.

Similar subset intransitivity is encountered in passive optical networks where wavelength continuity is required. In passive optical networks no optical fiber link of the passive optical network can transport two channels of a same wavelength. Accordingly a wavelength channel may be available on a first optical fiber link, and a second wavelength channel may be available on an adjacent link, but it is not possible to transmit a signal over both links in sequence.

Presenting the full-mesh abstracted topology therefore presents a new class of constrained routing problems for the edge network elements. Correctly identifying allowable routes is of high importance because every failed request constitutes a loss of processor time and congests network control channels.

While numerous methods for computing routes using Dijkstra's algorithm and a plurality of weights that resolve certain constraints, and using various techniques (artificial intelligence applications, and linear programming methods, etc.) are known, none of these methods can compute paths that are guaranteed to be optimum allowable paths subject to a subset intransitivity constraint.

Consequently, there remains a need for an abstraction of a physical network that introduces subset intransitivity that can be used for computing routes, so that edge network elements can be provided with a simplified representation of the network that is accurate for the routing requirements of the edge network element.

SUMMARY OF THE INVENTION

It is therefore an object of the invention to provide a method of permitting edge network elements in a complex network with intransitivity constraints to reliably compute allowable paths through the complex network without a complete knowledge of the network.

It is another object of the invention to enable edge elements in a complex network with intransitivity constraints to compute least cost routes through a complex network using an abstracted map of the network.

The invention therefore provides a method for computing paths through a data network that includes a subnetwork which introduces a subset intransitivity constraint on allowable paths through the data network. The method comprises using an abstracted map of the network that includes network elements (NEs) and subnetwork elements (SNEs), with links between pairs of the NEs and the SNEs to construct a directed graph that compensates for the subset intransitivity. A routing algorithm is then applied to compute paths from a start node to other nodes of the directed graph.

Constructing the directed graph is accomplished by creating a node in the directed graph to represent each NE in the abstracted network map. One ingress node and one egress node are also created to represent each SNE in the abstracted network map, and an edge is defined in the directed graph from that ingress node to that egress node. For each link between two SNEs in the same subnetwork, edges are defined in the directed graph from an ingress node representing a first SNE of the pair to an egress node representing a second SNE of the pair, and from the ingress node representing the second SNE of the pair to the egress node representing the first SNE of the pair. As well, for each link between a SNE and a NE, an edge is defined from the egress node representing the SNE to a node representing the NE, and an edge from the node representing the NE to the ingress node representing the SNE. For each link between two NEs, two oppositely directed edges are defined.

An effectively unlimited capacity is assigned to the edge in the directed graph between the ingress node and the egress node that represent each SNE. With respect to the other edges in the directed graph, available capacity of each of the links in the abstracted network map is received and edges in the directed graph that represent links that do not have capacity to support a desired path are removed from the graph. A cost associated with each of the links in the abstracted network map is also received and weights are assigned to edges of the directed graph based on the cost associated with the respective links that the edges represent. However, a null cost is assigned to the edge between the ingress and egress node that represents each SNE.

The invention further provides a network element (NE) having a routing processor for computing paths through a data network that includes a subnetwork which introduces subset intransitivity constraints on allowable paths through the network. The network element comprises a memory for storing an abstracted network map that includes network elements (NEs), subnetwork elements (SNEs) and links between pairs of SNEs and NEs; and program instructions for constructing a directed graph that compensates for the subset intransitivity, and for applying a routing algorithm to compute paths from a node representing the NE to the other nodes of the graph.

The abstracted network map may further comprise a second subnetwork that introduces an intransitivity constraint in the data network. If so, the network element further comprises program instructions for defining directed edges from egress nodes to ingress nodes for each link in the abstracted network map between gateway SNEs of the respective subnetworks.

The invention further provides a method for representing an abstracted network map of a data network as a directed graph to compensate for a subset intransitivity constraint on allowable paths through the data network. The subset intransitivity constraint is introduced by a subnetwork of the data network that includes a plurality of subnetwork elements. The abstracted network map includes the subnetwork elements (SNEs) and other network elements (NEs) interconnected by links. The method comprises creating a node in the directed graph to represent each of the NEs in the abstracted network map. One ingress node and one egress node are created to represent each SNE in the abstracted network map, and an edge from that ingress node to that egress node is defined. For each link in the abstracted network map between two SNEs in the same subnetwork, edges are defied from the ingress nodes to the egress nodes representing the respective SNEs interconnected by the link. In addition, for each link in the network map interconnecting a SNE and a NE, an edge is defined from the egress node representing the SNE to the node representing the NE, and an edge from the node representing the NE to the ingress node representing the SNE. Finally, for each link in the network map between two NEs, two oppositely directed edges are defined between the nodes representing the two NEs.

The invention also provides a computer product comprising a machine readable data signal containing executable instructions for performing the methods described above.

BRIEF DESCRIPTION OF THE DRAWINGS

Further features and advantages of the present invention will become apparent from the following detailed description, taken in combination with the appended drawings, in which.

It should be noted that throughout the appended drawings, like features are identified by like reference numerals.

DETAILED DESCRIPTION OF THE PREFERRED EMBODIMENT

The invention provides a method for using an abstracted network map of a virtual subnetwork that introduces a subset intransitivity constraints on allowable paths through the network. The abstracted network map may be used to compute least cost allowable paths through the network. The method involves using the abstracted network map to construct a directed graph that represents the abstracted network, but explicitly excludes paths that are not allowable. This constraint is enabled by representing bidirectional links as edges between subnetwork elements in a directed graph in which the subnetwork elements are represented by paired nodes in the directed graph.

Figure 1:
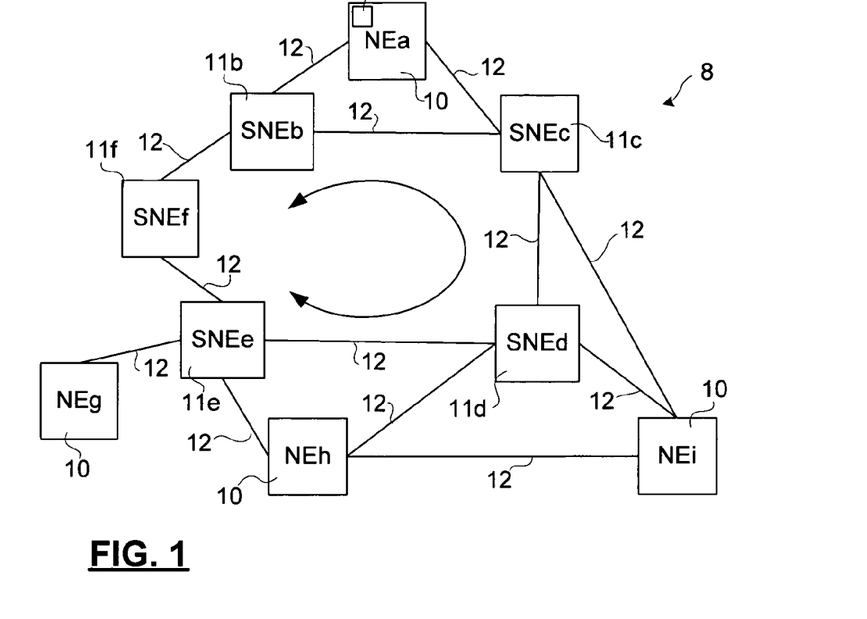
FIG. 1 schematically illustrates a first example of a network to which the present invention may be applied.

FIG. 1 schematically represents a network 8 comprising a plurality of network elements (NEs) 10 (NEs 10 are identified as NEa, NEg, NEh, NEi) interconnected by respective bidirectional links 12. As is well understood in the art, the NEs 10 respectively include at least one routing processor 14 (only one illustrated) for computing allowable routes through the network 8. The network 8 further includes subnetwork NEs (SNEs 11). As illustrated, SNE 11$b$, SNE 11$c$, SNE 11$d$, SNE 11$e$, and SNE 11$f$ are core NEs belonging to the subnetwork, whereas NEa, NEg, NEh, and NEi are edge NEs 10. The illustrated subnetwork is configured in a ring topology, and timeslot continuity is imposed on paths through the subnetwork in order to permit automatic protection switching, in a manner well known in the art. Consequently subset intransitivity is a constraint on routing through this network.

As discussed above, one of the reasons that core subnetwork providers want to present abstracted representations of their core subnetworks to client NEs, is that routing through the core may be unduly complicated, and/or the entire core architecture may simply not be relevant to a given edge NE. As illustrated, SNE 11$f$ is a tandem of the subnetwork that is not linked to an edge NE (that is accessible by the rest of the network). Accordingly edge NEa is provided, for example, with an abstracted network map shown in FIG. 2 by the core network provider.

Figure 2:
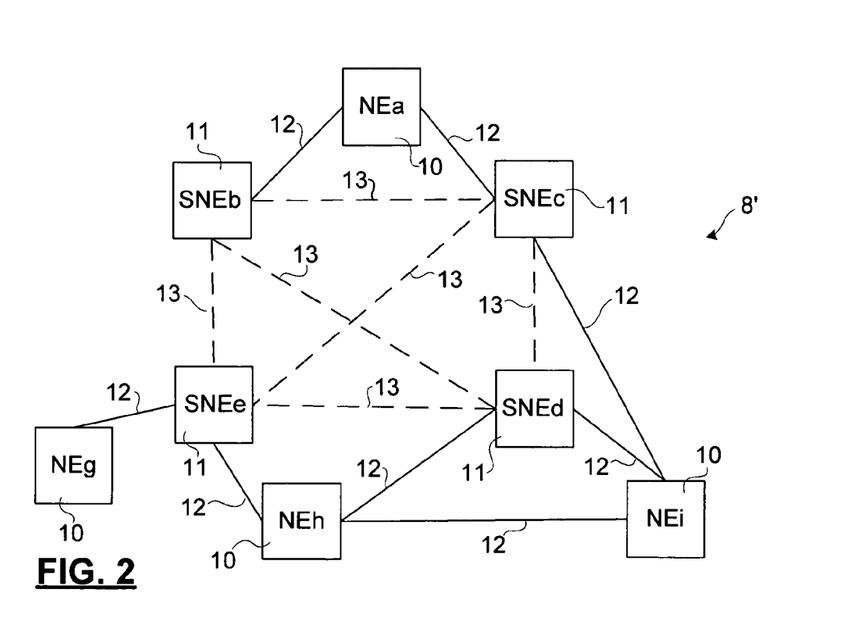
FIG. 2 schematically illustrates an abstracted network map of the network shown in FIG. 1.

FIG. 2 schematically illustrates an abstracted network map 8' of the network 8 shown in FIG. 1. The abstracted network map 8' includes a full-mesh connected virtual subnetwork (shown in dashed lines) interconnecting the SNEs 11 of the core subnetwork that are chosen by network management for display to NEa. It will be appreciated by those of skill in the art that numerous different abstracted network maps could have been chosen by network management for presentation to a respective edge NE, and further that different edge NEs may receive different abstracted network maps. Virtual links 13 that interconnect the SNEs 11 represent network routes available between the respective SNEs 11, but these routes are intransitive.

Using the abstracted network map 8' shown in FIG. 2, a graph is constructed, in accordance with the present invention. The graph represents the abstracted network, but excludes any paths that are not allowable in accordance with the subset intransitive constraint. A method for constructing a graph in accordance with the invention is further described below with reference to FIG. 7.

Figure 3:
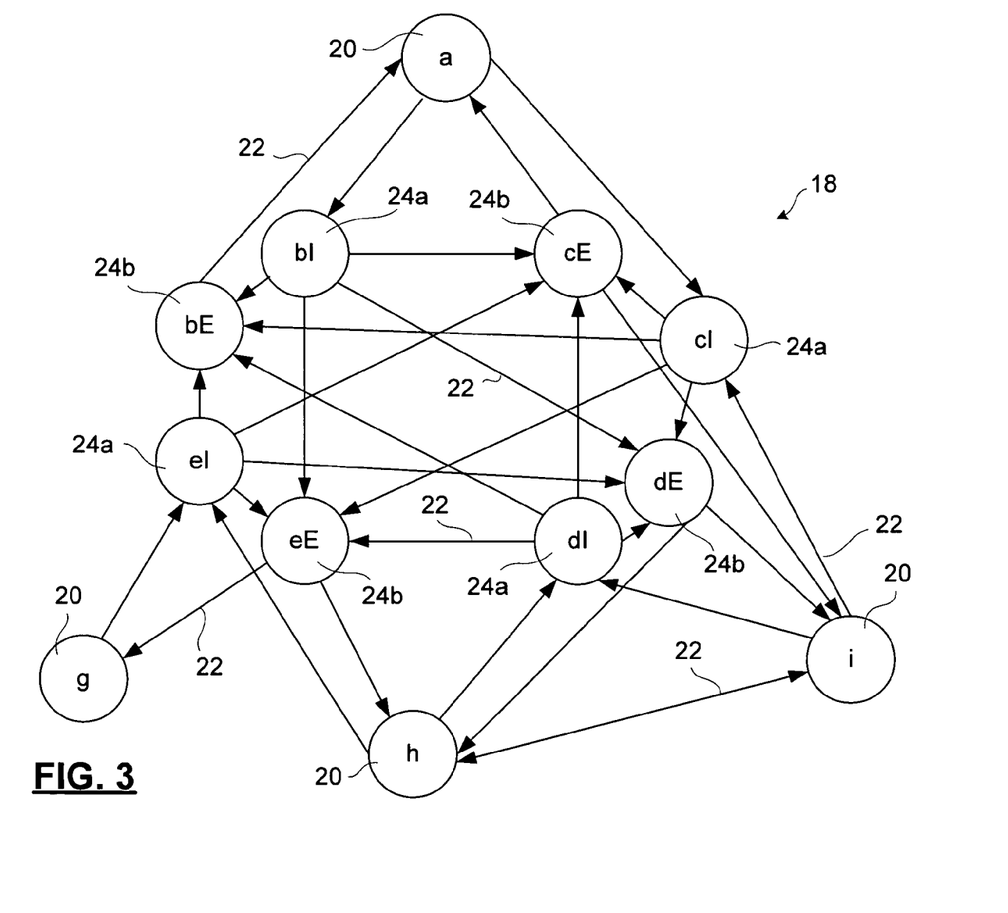
FIG. 3 schematically illustrates a graph representing the abstracted network map shown in FIG. 2.

FIG. 3 schematically illustrates a directed graph 18 representing the abstracted network map 8' shown in FIG. 2. The graph 18 includes a plurality of nodes, including nodes 20 that represent edge NEs, and nodes 24 that represent SNEs 11 (herein referred to as nodes of the virtual subnetwork). The graph 18 further includes (directed) edges 22 (only six of which are labeled for clarity of illustration), which interconnect the nodes. Each node is identified by the character (a, b, ... i) that corresponds to the character that identified a SNE 11/NE 10 that the node represents.

Each node 24 that represents a SNE 11, is further identified as an ingress (I) or an egress (E) node. In other words, a pair of nodes (such as bI and bE) collectively represent SNE 11b. The nodes are interconnected in accordance with a set of rules. The rules can be generalized as follows: for each bidirectional link 12/13 connecting a (S)NEx to a (S)NEy, two unidirectional edges are created. One edge interconnects xI to yE, and one edge interconnects yI to xE if x and y are in the same virtual subnetwork, and one edge that interconnects xE to yI, and another edge that interconnects yE to xI, if the two SNEs are in different virtual subnetworks. Only SNEs 11 are represented as E and I node pairs. Accordingly, if a link interconnects SNE 11x and NEy, edges from xE to y and from y to xI are defined.

It will be understood that if one starts at a given node (for example, i) one can advance (along an edge 22) to cI or dI, and from there to any egress node in the virtual subnetwork, or via h to either dI or eI. The only available edges once the virtual subnetwork is entered, is to an egress node, and accordingly no path can transit two subnetwork links in sequence. By representing the corresponding SNE 11, and not defining edges from egress nodes to ingress nodes, paths formed by following the directed edges cannot transit two subnetwork links in sequence. This ensures that paths formed through the abstracted network map conform to the subset intransitivity constraint. As the abstracted network map 8' is bidirectional each allowable path across the graph 18, although it is unidirectional, is uniquely associated with an allowable bi-directional route through the abstracted network map.

The edges between an ingress and an egress node of a same SNE 11 are included to permit paths such as h, eI, eE, g, which is allowable. However, such edges are not treated as other edges that represent links for routing purposes in that there would be no cost or capacity limitation associated with them because these edges do not represent resources of the abstracted network map 8'. In other words, the directed edges that interconnect the ingress node and the egress node that represent a SNE 11 are assigned a null cost and an unlimited capacity. There may be a weight inherited by the other edges of the graph 18 from the bidirectional links, and those weights may be used with Dijkstra's algorithm to compute least cost paths between the nodes (for example from node a to the other nodes of the abstracted network map). Further, available capacity of the links may be used to remove links 12 from the abstracted network map 8', prior to constructing the graph 18 and applying Dijkstra's algorithm, if the links have insufficient available capacity to support traffic of a predefined bandwidth.

Figure 4:
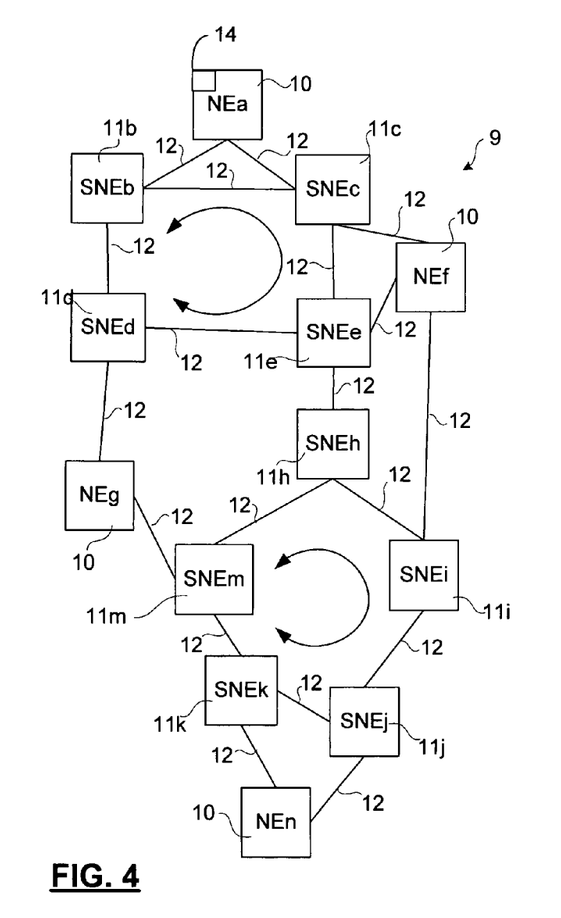
FIG. 4 schematically illustrates a second example of a network to which the present invention may be applied.

FIG. 4 schematically illustrates a second network 9 to which the invention may be applied. The second network 9 includes two core subnetworks; a first with four SNEs 11 (SNE 11b, SNE 11c, SNE 11d, SNE 11e) and a second with five SNEs 11 (SNE 11h, SNE 11i, SNE 11j, SNE 11k, SNE 11m). The two core subnetworks are interconnected via SNEe and SNEh. The network 9 also includes edge NEs 10 (NEa, NEf, NEg, NEn). NEf is linked to SNE 11c and SNE 11e of the first core subnetwork, and SNE 11i of the second core subnetwork, and NEg is linked to SNE 11d of the first core subnetwork, and SNE 11m of the second core subnetwork. NEa is only linked to the first core subnetwork, and NEn is only linked to the second core subnetwork.

Figure 5:
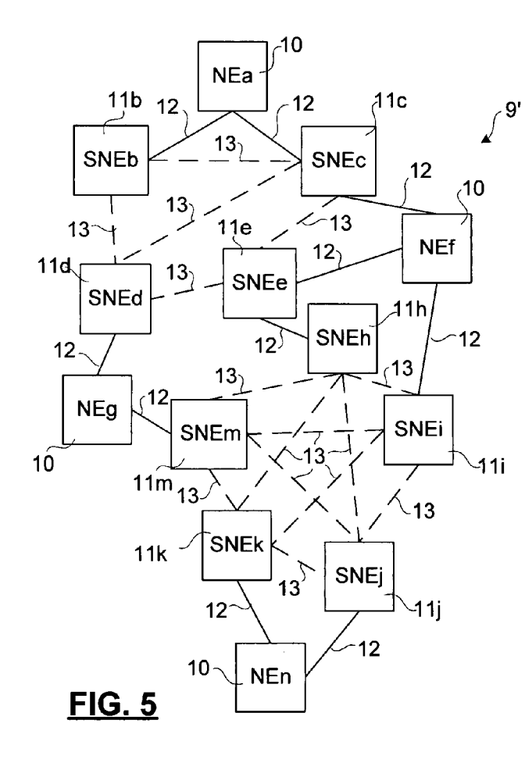
FIG. 5 schematically illustrates an abstracted network map of the network shown in FIG. 4.

Given network 9, an abstracted network map 9' shown in FIG. 5 is presented to the edge NEa, or a network routing processor associated with NEa where routing decisions are made. The first core subnetwork is characterized as a mesh connected virtual subnetwork that is full-mesh connected by respective subnetwork links 13, except that NEb and NEe are not interconnected. The management of the first core subnetwork may have any number of reasons for presenting such an abstracted network map 9' and for not offering a direct connection between any two core NEs. Moreover, virtual subnetwork links may be dropped for routing purposes if it is determined that insufficient capacity is likely to be available on the link to support a desired volume of traffic for a particular route derivation. Similarly subnetwork links 13 interconnect the second core subnetwork, in this case forming a full-mesh virtual subnetwork.

Figure 6:
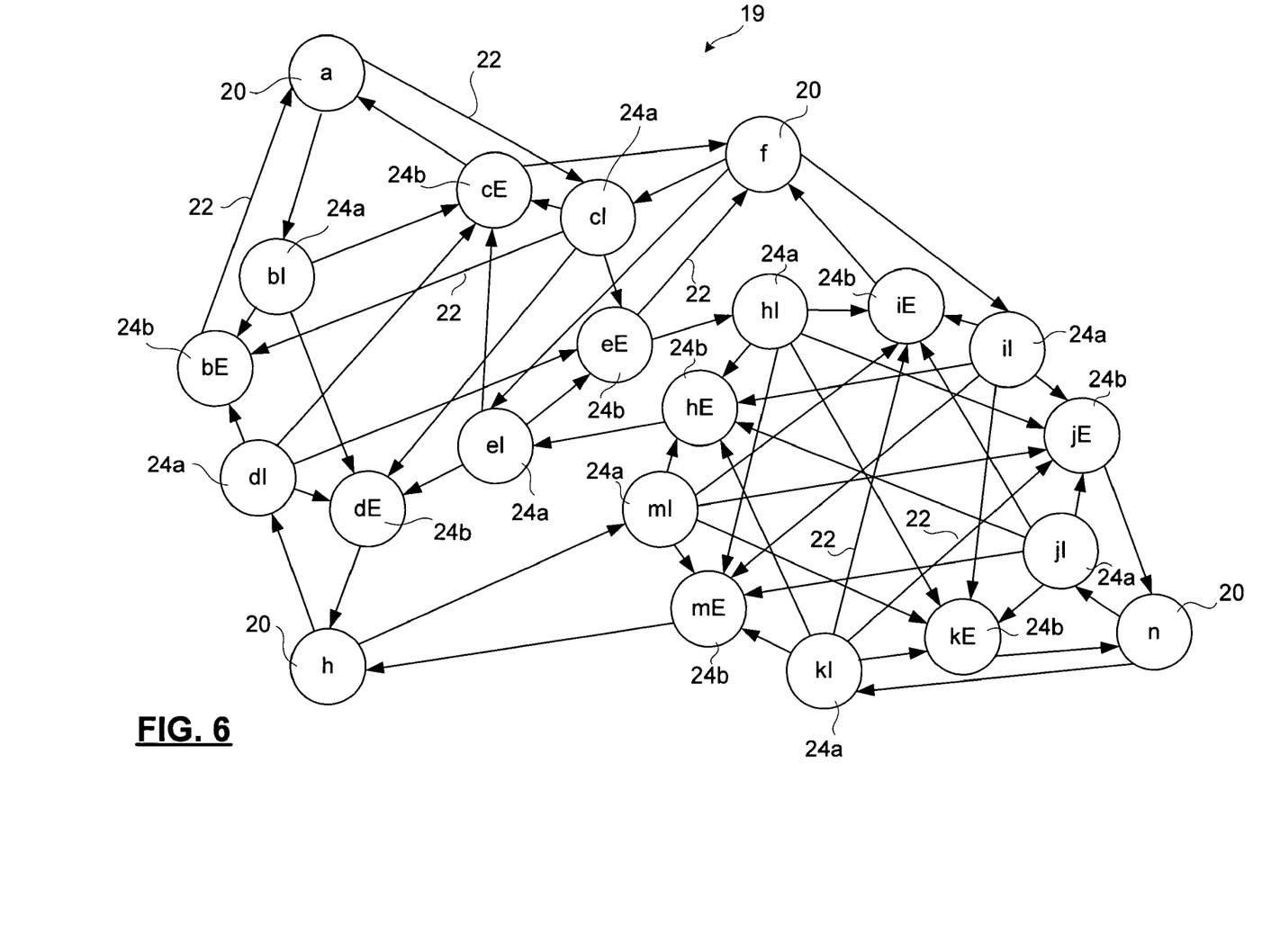
FIG. 6 schematically illustrates a graph representing the abstracted network map shown in FIG. 5.

Given the abstracted network map 9' shown in FIG. 5, a directed graph 19 illustrated in FIG. 6 is constructed. The construction follows the same rules for creating nodes (ingress and egress for the SNEs 11) and for interconnecting the nodes by corresponding directed edges 22 (again only six of which are labeled) as were shown and described in FIG. 3, and accordingly that description is not repeated here. However, it should be noted that the nodes eI and eE of the first virtual subnetwork are edge connected with node hE and node hI of the second virtual subnetwork, to provide interconnection of the first virtual subnetwork and the second virtual subnetwork via a corresponding bidirectional link 12 between SNEh and SNEe.

Figure 7:
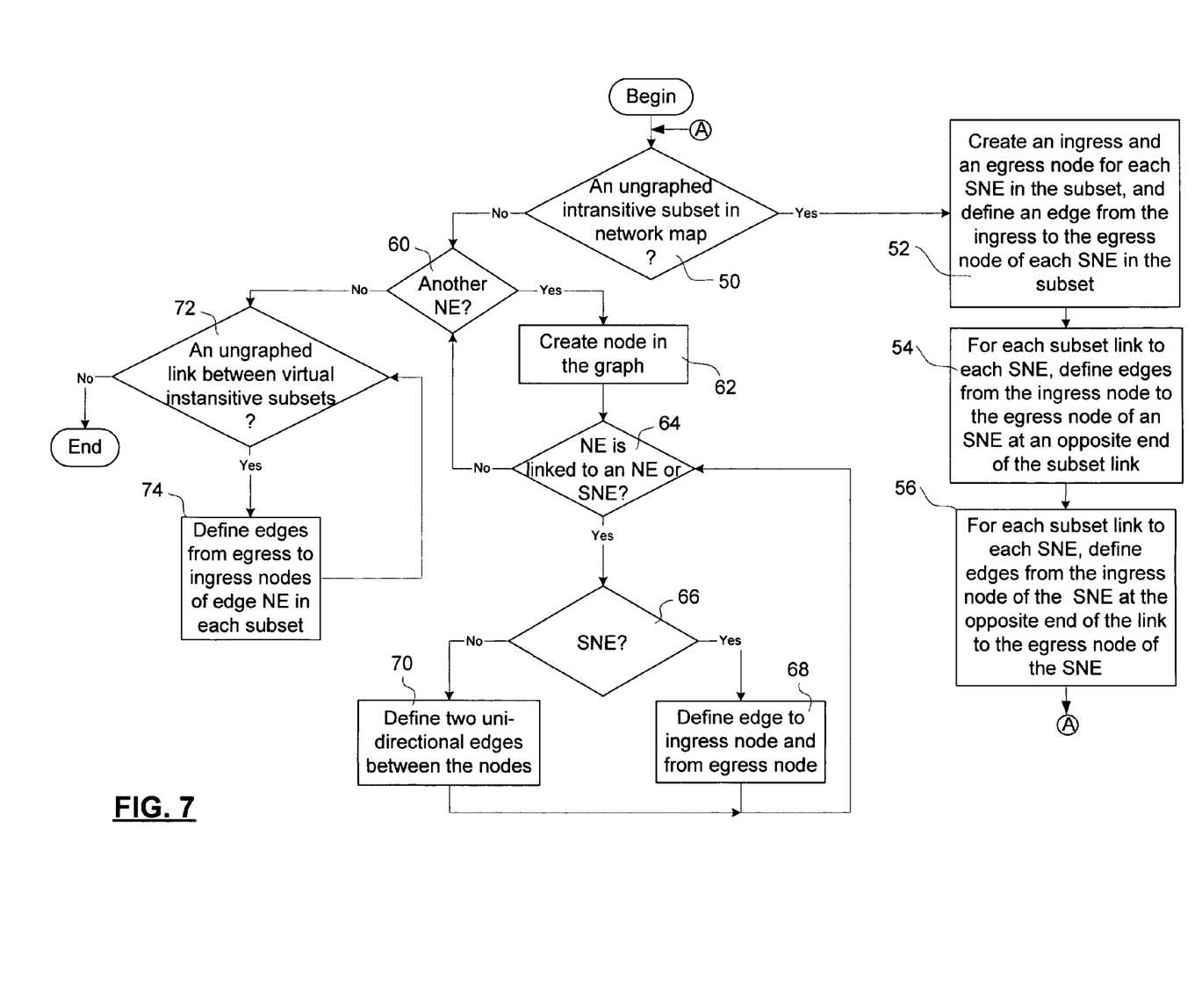
FIG. 7 is a flow chart illustrating principal steps involved in constructing a graph representing an abstracted network map in accordance with the invention.

FIG. 7 schematically illustrates one way that an abstracted network map (such as abstracted network maps 8',9') that includes an identified subset that is intransitive (such as the virtual subnetworks), can be used to construct corresponding directed graphs (18,19), in accordance with the invention. The invention can be applied to provide a representation that can be used for path validation, or for computing paths using known algorithms. The process of FIG. 7 proceeds by inspecting NEs/SNEs of the abstracted network map in a given order, although any other order that results in the same graph may also be used.

The process begins with a determination (step 50) of whether there is an ungraphed intransitive subset (virtual subnetwork) in the abstracted network map. It is assumed that there is at least one intransitive subset in the abstract network map that introduces a subset intransitivity constraint on allowable routes. The procedure therefore identifies a first of the intransitive subsets, and then for each of the SNEs in the subset, a pair of nodes is created (step 52). One of the pair is an ingress node 24a and the other is an egress node 24b (see FIG. 3). An edge in the directed graph is defined from the ingress node 24a to the egress node 24b. Subsequently the process creates edges to all of the created node pairs in the intransitive subset (steps 54 and 56). Accordingly, for each subset link to each SNE in the intransitive subset, a directed edge is defined from the SNE's ingress node 24*a* to the egress node 24*b* of an SNE at an opposite end of the link (step 54), and from the ingress node of SNE at the opposite end of the link to the egress node 24*b* of the SNE (step 56). After all SNEs and all the links in the intransitive subset are graphed, the procedure returns to step 50.

After all of SNEs in all of the intransitive subsets in the abstracted network map are graphed as pairs of ingress 24*a* and egress 24*b* nodes that are interconnected by directed edges, the procedure advances to step 60, wherein it is determined whether any other NEs (i.e. a NE that is not in any intransitive subset) remains ungraphed. If an ungraphed NE is found, a node in the graph is created (step 62), and it is determined whether the NE is linked to another NE in the abstracted network map (step 64). For each link to the NE with an opposite SNE/NE (at an opposite end of the link) that is represented in the graph, it is determined whether the opposite S/NE is a graphed member of one of the intransitive subset(s). If the opposite SNE/NE is in an intransitive subset, it represented as an ingress node 24*a* and an egress node 24*b* of the graph. Edges are defined from the node representing the NE to the ingress node 24*a*, and from the egress node 24*b* to the node representing the NE (step 68). Otherwise, the opposite SNE/NE is not in an intransitive subset, and, in step 70, two edges are defined between the ingress node 24*a* and the egress node 24*b*, in opposite directions.

Once all of the other graphed NEs/SNEs 11 linked to the NE have been represented by corresponding edges in the graph, as determined in step 64, the procedure returns to step 60. After all of the NEs have been graphed, and interconnections of these nodes by corresponding edges has been completed, the procedure advances to step 72 where it is determined if there are any links between gateway SNEs 11 that are in respective, different intransitive subsets. To represent each of the links between the two gateway SNEs 11, a pair of edges are graphed from the egress nodes 24*b* to the ingress nodes 24*a* of the respective gateway SNEs 11 (step 74). When all of the links between the gateway SNEs 11 are graphed, the process ends.

Figure 8:
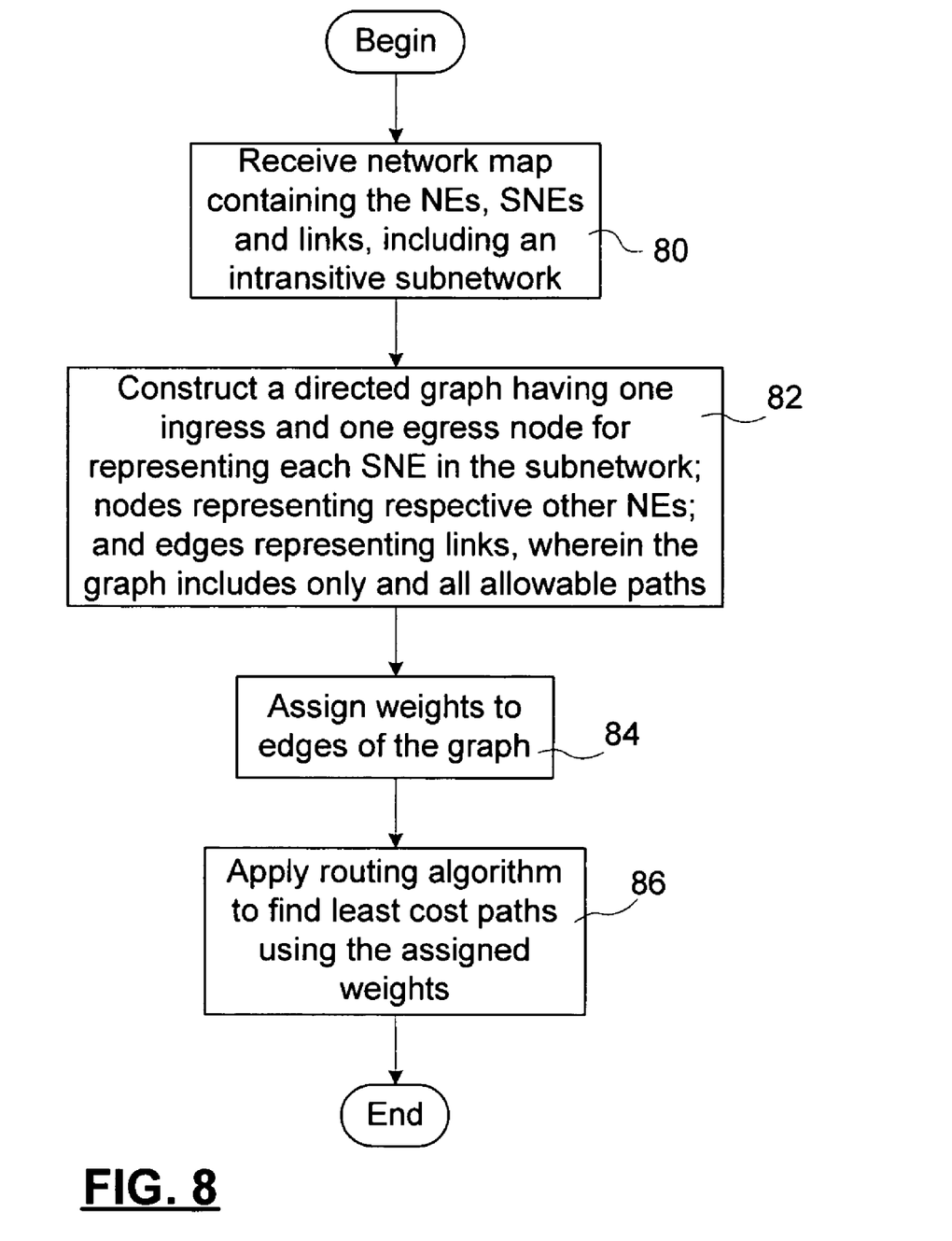
FIG. 8 is a flow chart illustrating principal steps involved in computing paths through a network in accordance with an embodiment of the invention.

FIG. 8 illustrates one application of the process shown in FIG. 7. FIG. 8 illustrates principal steps involved in computing paths through a network that includes an intransitive subnetwork. The process shown in FIG. 8 begins when an abstracted network map is received that includes NEs/SNEs 11 and links therebetween (step 80). SNEs, and links therebetween, constitute the intransitive subnetwork, and accordingly a viable path cannot include two sequentially consecutive virtual subnetwork links.

In step 82, a directed graph is constructed using, for example, the method shown in FIG. 7. Each SNE 11 in an intransitive subnetwork is represented by a respective pair of nodes (one ingress node 24*a* and one egress node 24*b*), and the other NEs are represented by respective single nodes. Alternatively, the other NEs could be represented by pairs of ingress and egress nodes that are edge connected in both directions, for example. The directed graph further includes, for each link between two NEs/SNEs, two oppositely directed edges between nodes representing the NEs/SNEs. Following the edges of the directed graph yields only admissible paths through the abstracted network.

In step 84, weights are assigned to the edges. Each link in the abstracted network is associated with a cost of use, which is used to obtain a corresponding weight for the graphed edge. Dijkstra's algorithm (step 86) may be applied to the weighted directed graph, and the weights guide the selection of least cost paths. In other embodiments, steps 84 and 86 may be omitted and the directed graph may be used to verify that a path computed in another manner is allowable with respect to the subset intransitivity constraint.

It will be appreciated that in a data transport network context, the abstracted network map may be changed dynamically because of changes in availability, link occupation, in the cost of use, or other factors. Each time new information is received the procedure may be reapplied to determine optimum routes.

The embodiments of the invention described above are intended to be exemplary only. The scope of the invention is therefore intended to be limited solely by the scope of the appended claims.

We claim:

1. A method for computing paths through a data network that includes a subnetwork which introduces a subset intransitivity constraint on allowable paths through the data network, wherein each one of two adjacent links have sufficient capacity to convey traffic but it is not possible to transmit that traffic through both links in sequence, the method comprising:

using an abstracted map of the network that includes network elements (NEs) and subnetwork elements (SNEs), with links between pairs of the NEs and the SNEs to construct a directed graph that compensates for the subset intransitivity constraint; and applying a routing algorithm to compute paths from a start node to the other nodes of the directed graph, wherein the constructing the directed graph comprises:

creating a node in the directed graph to represent each NE in the abstracted network map;

creating in the graph one ingress node and one egress node to represent each SNE in the abstracted network map, and defining an edge in the directed graph from the ingress node to the egress node;

for each link between two SNEs in the same subnetwork, defining edges in the directed graph from an ingress node representing a first SNE of the pair to the an egress node representing a second SNE of the pair, and from the ingress node representing the second SNE of the pair to the egress node representing the first SNE of the pair;

for each link between a SNE and a NE, defining an edge from the egress node representing the SNE to a node representing the NE, and an edge from the node representing the NE to the ingress node representing the SNE; and for each link between two NEs, defining two oppositely directed edges between the nodes representing the NEs.

2. The method as claimed in claim 1 wherein the routing algorithm used to compute paths is Dijkstra's algorithm.

3. The method as claimed in claim 1 further comprising:

assigning an effectively unlimited capacity to the edge in the directed graph between the ingress node and the egress node that represent each SNE.

4. The method as claimed in claim 1 further comprising:

receiving available capacity of each of the links in the abstracted network map; and removing edges representing links that do not have capacity to support a desired path.

5. The method as claimed in claim 3 further comprising:

receiving a cost associated with each of the links in the abstracted network map;

assigning weights to edges of the directed graph, based on the cost associated with the respective links that the edges in the directed graph represent; and assigning a null cost to the edge between the ingress and egress node that represents each SNE.

6. The method as claimed in claim 5 wherein the abstracted network map further comprises a second subnetwork which introduces a subset intransitivity constraint on allowable paths through the data network and the method further comprises:
defining, for each link in the network map between SNEs of the respective subnetworks, directed edges from the respective egress nodes to the respective ingress nodes that represent the SNEs.

7. The method as claimed in claim 6 wherein the abstracted network map comprises a full-mesh connected virtual subnetwork abstracted from at least a part of an optical subnetwork having a ring topology with edge networks connected to the SNEs of the virtual subnetwork.

8. The method as claimed in claim 6 wherein the abstracted network map comprises a full-mesh connected virtual subnetwork abstracted from at least a part of a passive optical subnetwork with edge networks connected to the SNEs of the virtual subnetwork.

9. A network element (NE) having a routing processor for computing paths through a data network that includes a subnetwork that introduces subset intransitivity constraints on allowable paths through the network, wherein each one of two adjacent links have sufficient capacity to convey traffic but it is not possible to transmit that traffic through both links in sequence, the network element comprising:
a memory for storing an abstracted network map that includes network elements (NEs), subnetwork elements (SNEs) and links between pairs of SNEs, and NEs; and
a computer readable medium storing program instructions for constructing a directed graph that compensates for the subset intransitivity constraint, and for applying a routing algorithm to compute paths from a node representing the NE to the other nodes of the graph,
wherein the program instructions comprise modules for:
creating a node for representing each NE in the abstracted network map;
creating one ingress node and one egress node for representing each SNE in the abstracted network map, and defining a directed edge from the ingress node to the egress node;
defining edges from respective ingress nodes to respective egress nodes for each link between two SNEs in the same subnetwork of the abstracted network map;
defining a directed edge from an egress node representing each SNE to a node representing any NE having a link to the SNE in the abstracted network map, and a directed edge from the node representing the NE to an ingress node representing the SNE; and
defining two oppositely directed edges for each link between nodes representing NEs in the abstracted network map.

10. The network element as claimed in claim 9 wherein the links are bi-directional network links, and a unidirectional path computed through the directed graph is uniquely associated with an allowable bi-directional route through the abstracted network map.

11. The network element as claimed in claim 9 further comprising, stored on the computer readable medium:
program instructions for receiving available capacity information regarding each of the links in the abstracted network map;
program instructions for removing edges from the directed graph that represent links that do not have a predetermined available capacity; and program instructions for assigning an unlimited capacity to the directed edge between the ingress and egress node representing each SNE.

12. The network element as claimed in claim 11 further comprising, stored on the computer readable medium:
program instructions for receiving costs of each of the links in the network map;
program instructions for assigning weights to edges of the directed graph, the weights corresponding to costs of links that the edges represent; and
program instructions for assigning a null cost to links between the ingress node and the egress node that represent each SNE.

13. The network element as claimed in claim 12 wherein the abstracted network map further comprises a second subnetwork that introduces an intransitivity constraint in the data network, further comprising program instructions for defining directed edges from egress nodes to ingress nodes for each link in the abstracted network map between gateway SNEs of the respective subnetworks.

14. The network element as claimed in claim 13 wherein the network routing processor is a component of another NE, which is a root node of the directed graph in the application of Dijkstra's algorithm, so that the paths are computed by the other NE.

15. A method for representing an abstracted network map of a data network as a directed graph to compensate for a subset intransitivity constraint introduced by a subnetwork of subnetwork elements on allowable paths through the data network, the abstracted network map including the subnetwork elements (SNEs) and other network elements (NEs) interconnected by links, the method comprising:
creating a node in the directed graph to represent each of the NEs in the abstracted network map;
creating one ingress node and one egress node to represent each SNE in the abstracted network map, and defining an edge from the ingress node to the egress node;
for each link in the abstracted network map between two SNEs in the subnetwork, defining edges from the ingress nodes to the egress nodes representing the respective SNEs interconnected by the link;
for each link in the network map interconnecting a SNE and a NE, defining an edge from the egress node representing the SNE to the node representing the NE, and an edge from the node representing the NE to the ingress node representing the SNE; and
for each link in the network map between two NEs, defining two oppositely directed edges between the nodes representing the two NEs.

16. The method as claimed in claim 15 wherein the abstracted network map comprises a plurality of subnetworks, each introducing respective subset intransitivity constraints on allowable paths through the network, and the method further comprises defining a directed edge from the egress node to the ingress node representing the respective gateway SNEs interconnected by a link.

17. The method as claimed in claim 16 further comprising assigning a weight to each edge in the graph in correspondence with a cost of using a respective bidirectional link in the network map.

18. The method as claimed in claim 17 further comprising assigning a null cost to each directed edge between the ingress and the egress node that represents the SNE.

19. The method as claimed in claim 18 further comprising removing all directed edges in the graph that represent links that do not have a predefined available capacity.

* * * * *